Nov. 9, 1926.

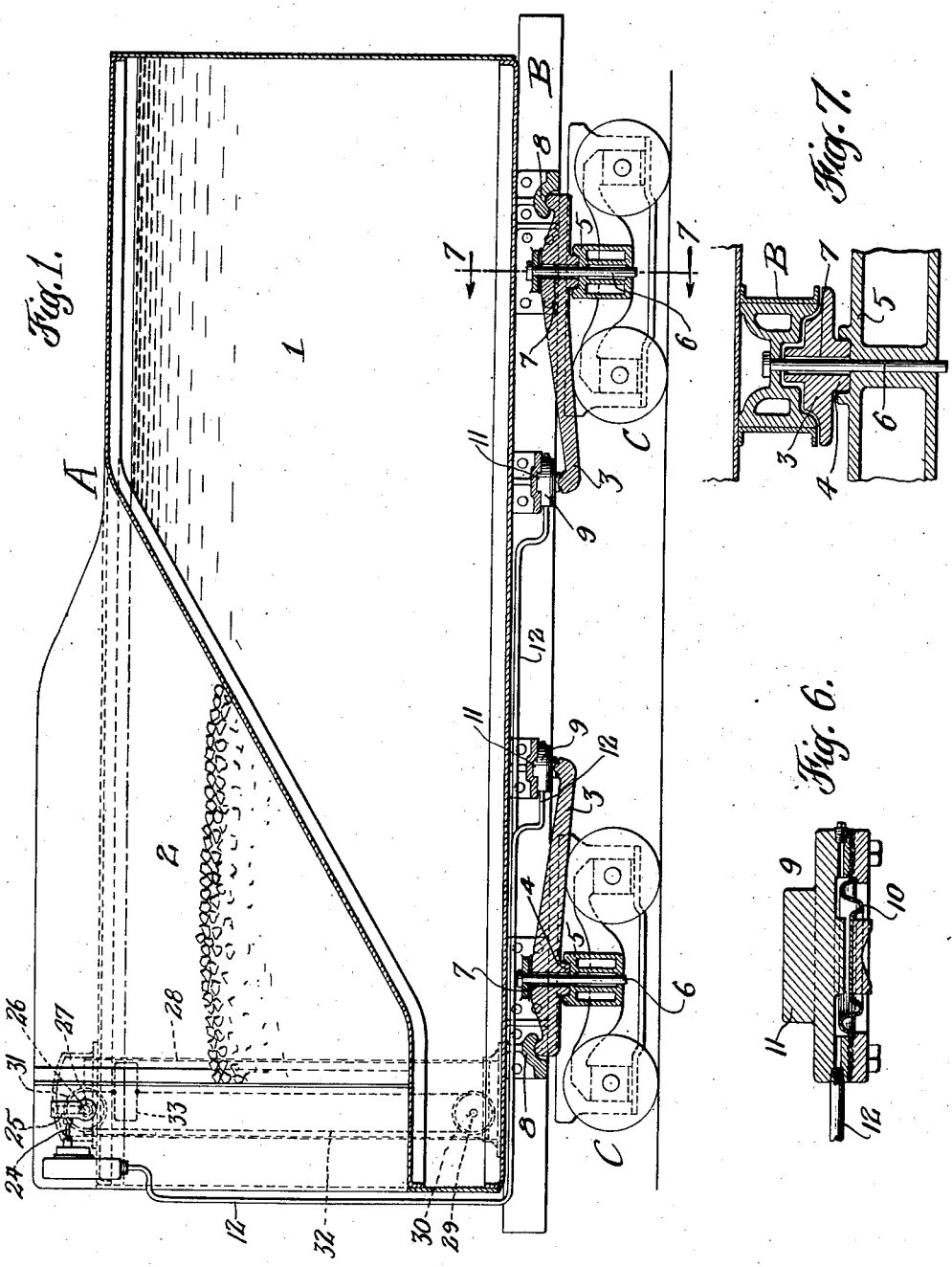

E. A. AVERILL 1,606,333

WEIGHING DEVICE

Filed Sept. 1, 1923      3 Sheets-Sheet 2

WITNESS
Gustav Genzlinger

INVENTOR
Earl A. Averill
BY
ATTORNEYS

Nov. 9, 1926.
E. A. AVERILL
1,606,333
WEIGHING DEVICE
Filed Sept. 1, 1923     3 Sheets-Sheet 3
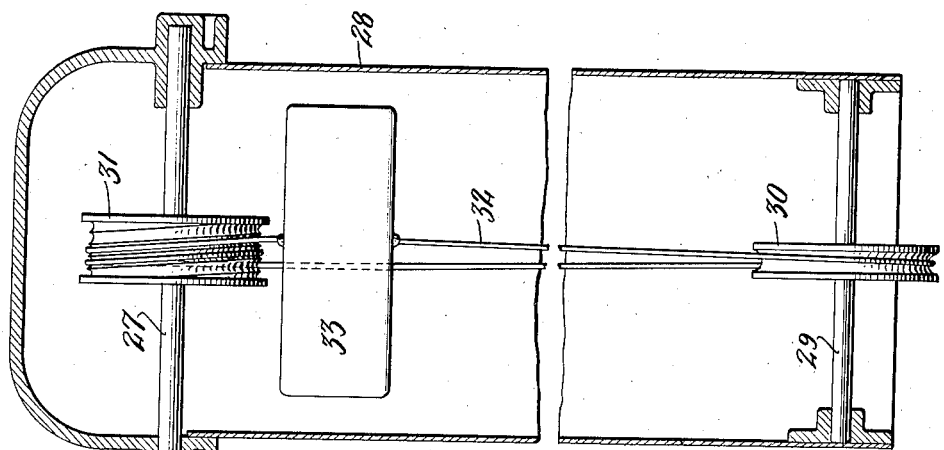
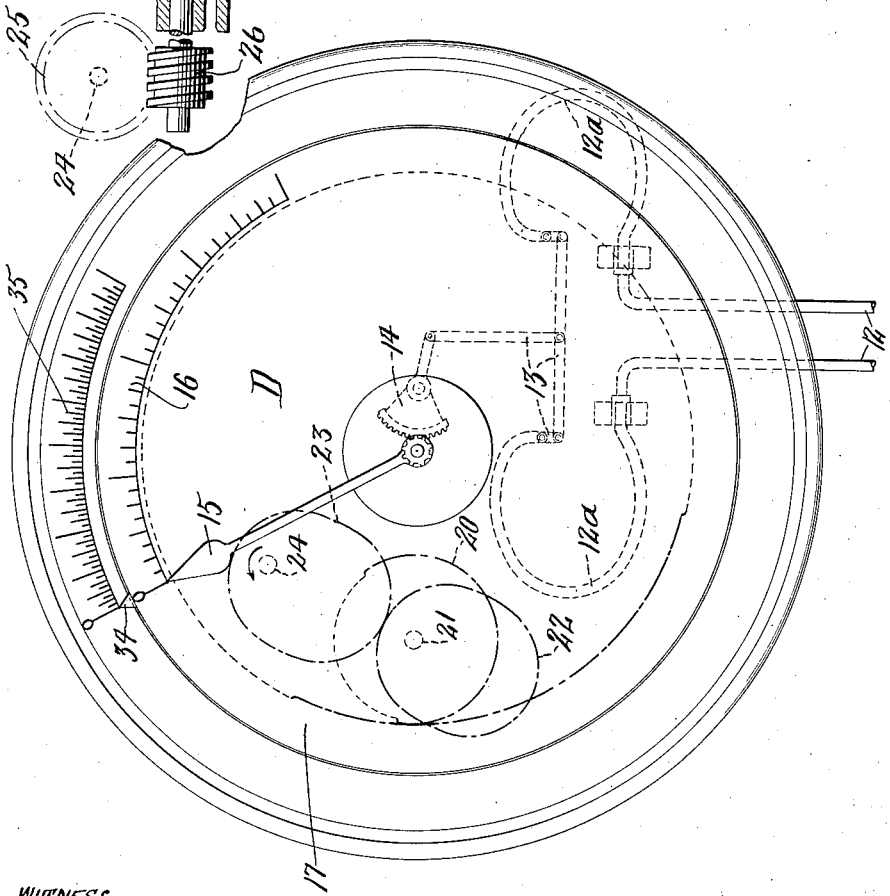

Patented Nov. 9, 1926.

1,606,333

UNITED STATES PATENT OFFICE.

EARL A. AVERILL, OF MOUNT VERNON, NEW YORK.

WEIGHING DEVICE.

Application filed September 1, 1923. Serial No. 660,503.

This invention relates to a device which is particularly useful for indicating, at all times the weight or quantity of coal and also of water on the tender of a locomotive.

Among the objects of the invention is the provision of such a device which will give a constant indication upon a single instrument of the exact quantity of coal and also of water to be found on the tender.

Stated more specifically I provide, in my device, a suitable indicator, preferably a pivoted arm, which is acted upon by the entire weight of the tender above the trucks including whatever coal and water may be aboard but which is arranged, however, to indicate zero whenever the tender is empty for the reason that the present embodiment of the invention is interested in the quantities of coal and water only.

In so far as I am aware there has heretofore been no practical method whereby any indication could be obtained either as to how much coal or water happens to be aboard at the time or the quantities which were being used under various conditions of service and at different times and seasons of the year. I propose to make it possible to obtain a ready comparison between the quantities of coal consumed by the same locomotive under the direction of different engineers. I also aim to provide a scheme for comparing the consumption of coal or water by different classes of locomotives doing equal work and to obtain information from records made possible by my invention to determine whether or not a cheaper coal would not be just as, if not more, satisfactory for a certain class of service than a more expensive coal.

In short there are a very great many ways in which a device of the character described would be extremely valuable and advantageous. The accompanying drawings illustrate my invention in connection with a locomotive tender with its coal and water supplies but it is to be understood that it is not directly limited to such an application only as the principles involved might be very well used in other instances where two or more different materials are carried upon a common support or vehicle.

Figure 3:
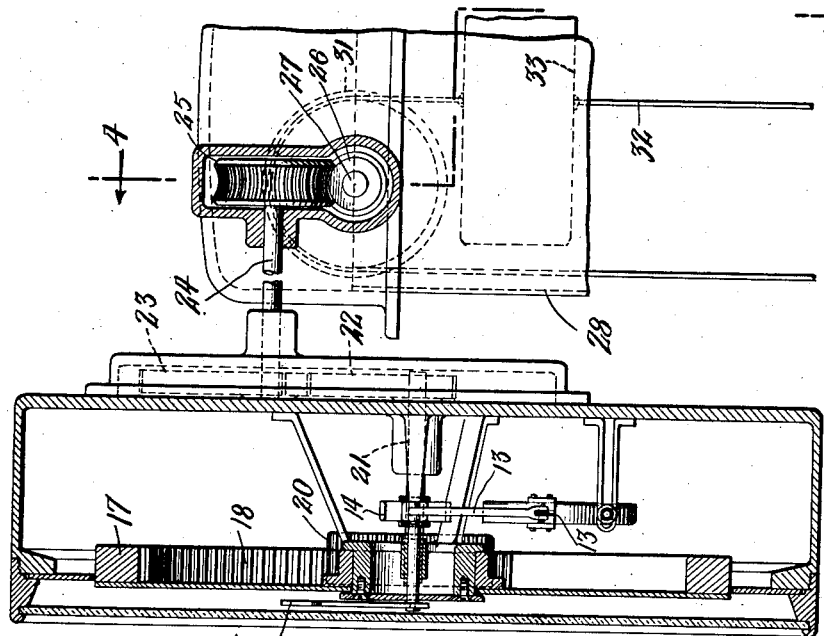
Figure 2:
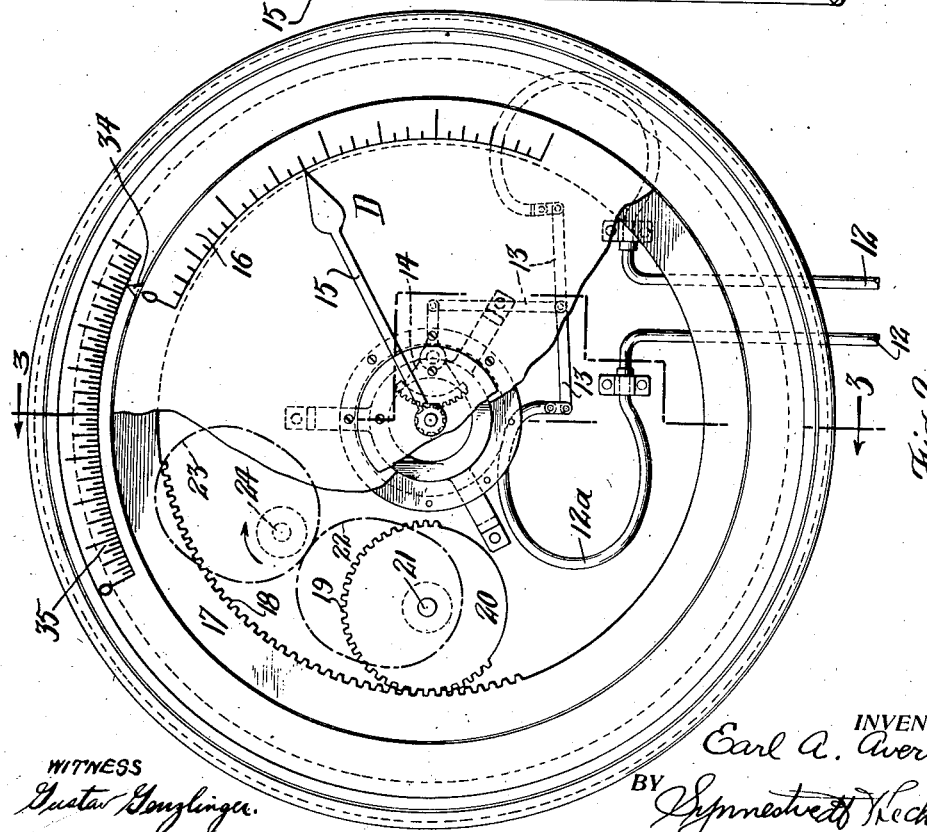

The drawings illustrate the invention in a preferred form Figure 1 being a vertical longitudinal section through a locomotive tender embodying my invention; Figure 2 being a front elevation partly broken away of the indicating dial with its associated mechanism; Figure 3 being a section on the line 3—3 of Figure 2; Figure 4 being a section on the line 4—4 of Figure 3; Figure 5 being a face view of the dial similar to that of Figure 2 with certain parts in dotted lines and with the mechanism indicating zero or an empty tender; Figure 6 being a vertical longitudinal section through one of the pressure diaphragms utilized by my invention; and Figure 7 being a section on the line 7—7 of Figure 1.

Before entering upon a detailed description of the apparatus illustrated I wish to make the following preface, as it were, so that the operation of the device will be more readily understood as the description progresses.

By means of certain apparatus between the trucks and the main framework or body of the tender I obtain an indication of the total weight of the tender including its respective quantities of coal and water. This indication I prefer to have made through the medium of a pivoted needle of the type and operated in the manner of a Bourdon gauge or scale. Since I am primarily interested only in a reading as to the quantities of coal and water on board the tender I arrange this needle so that it will indicate zero when the tender is empty.

Associated with the needle I provide a movable scale actuated by float mechanism in the water compartment of the tender. As the supply of water increases or decreases this movable scale will move in a corresponding direction and in a corresponding degree. The reading on the movable scale will therefore indicate only the quantity of coal on board the tender and this reading will be indicated by the pivoted needle.

In order to obtain a reading as to the quantity of water on board the tender I attach a pointer on the movable dial which passes across a fixed scale arranged to indicate either the pounds or the gallons of water present on the tender. With this foreword the details of the apparatus will be discussed.

The tender A of Figure 1 is provided with the usual water space 1 and the usual coal space 2, the water space being shown as practically full while the coal space is shown as being only partially full. Between the sill structure or framework B and the truck structures C, I arrange two heavy levers 3, one for each truck. They are heavy castings and each of them may include a circular boss 4 which rests upon the usual truck bolster 5. The usual truck center pin 6 is also incorporated which is arranged to extend through an enlarged hole 7 in the lever casting.

One end of each lever receives the weight of the tender with its coal and water through the lugs 8 while the other end receives it through the diaphragm apparatus 9, the latter being illustrated in detail in Figure 6. This diaphragm apparatus is a part of the Bourdon scale structure above mentioned.

There is a fluid, preferably oil, confined in the space between the diaphragm 10 (see Figure 6) and the upper portion 11 of the apparatus 9 such fluid extending continuously throughout the tube 12 to the linkage members 13 of the Bourdon scale D.

According to the well known principle of the Bourdon scale the flexible curved portions $12^a$ of the tubes will move at the ends in direct relation to the degree of weight or pressure imposed upon the fluid through the diaphragm 10. As the pressure increases the pivoted gear segment 14 will rotate counterclockwise and the pivoted indicator needle 15 will rotate in a clockwise direction. It will thus be seen that the position of the needle 15 will indicate the total weight of the tender with its coal and water. I have arranged however to have the zero position of the needle 15 indicate an empty tender as shown in Figure 5. However, as will appear hereinafter the scale over which the indicator 15 passes is a movable scale so that the above statement holds true only so long as the movable scale is in the position indicated in Figure 5. The particular and special relation between the needle 15 and the two scales illustrated will appear hereinafter.

The scale 16 is movable as already indicated and mounted upon it is the ring 17. The inner face of this ring is provided with a series of teeth 18 adapted to mesh with corresponding teeth 19 on a gear 20 mounted on shaft 21.

Fixed to the same shaft 21 upon which the gear 20 is mounted is an elliptical gear 22 adapted to mesh with a correspondingly shaped elliptical gear 23 on the shaft 24. The shaft 24 carries at its outer end a worm gear 25 adapted to mesh with a worm 26 on the end of a shaft 27 extending into a receptacle 28 located at a suitable point within the water space of the tender. This receptacle is in free communication with the water in the tender the level of the water in the former being the same at all times as the level of the water in the latter.

Near the bottom the receptacle 28 is provided with another shaft 29 upon which is mounted a pulley 30. A pulley 31 is mounted on the shaft 27 and between the two pulleys is arranged a cord or line 32 included in the length of which is a float member 33. As the level of the water rises and falls the float also will rise and fall causing the shaft 27 to turn and also the ring 17 carrying with it the scale 16 through the medium of the various connections just enumerated.

It will thus be seen that the level of the water in the tender compartment 1 is reflected in the position of the movable scale 16, the scale 16 being arranged to move in direct relation to the depth of the water.

Because of the irregular configuration of the water space of the tender (the same being considerably smaller in area at the top than at the bottom) it is necessary to make some compensation in the degree of movement of the scale 16. Most tenders are arranged so that this variation is a graduated one from top to bottom and I have taken advantage of this fact to introduce gears 22 and 23 of irregular contour.

The weight of water covering the area at the top of the tank to a depth of one inch will be considerably less than the weight of water covering the area at the bottom of the tank to a depth of one inch generally with a substantially uniform graduation in between. It is necessary to cause the scale 16 to move a greater amount for each vertical inch travelled by the float 33 at or near the bottom than it is at the top so as to obtain synchronous movement of the scale with the needle 15.

The shafts of the irregular gears are off center as clearly illustrated so that the gears are in effect cams. When the tank is empty the edge of the gear 23 which is farthest away from the shaft 24 meshes with the edge of the gear 22 which is closest to its shaft 21. As the tank fills rotation of the gear 23 will rotate the gear 22 moving it quite rapidly during its initial movement but more gradually and in lesser and lesser increments during the later stages of filling the tank.

In Figure 5 as indicated the tender is shown as empty of coal and water while in Figure 2 which corresponds roughly to the showing of Figure 1 the needle 15 is indicating roughly about a half a load of coal while the other indicator yet to be described is indicating practically a full tank of water.

The scale 16 is provided with a pointer 34 located directly over the zero mark which pointer is arranged to pass over a second scale 35 which second scale is a fixed scale. By virtue of the elliptical gears herein described it is possible to make the graduation marks on the scale 35 of uniform size since the difference in weight per inch depth of water between the top of the tender tank and the bottom of the tender tank is taken care of by the ratio or speed of movement between the two gears 22 and 23.

It will thus be apparent that the scale 16 in conjunction with the needle 15 will always give an accurate reading of the exact amount of coal on board the tender at any given time and that the scale 35 in conjunction with the pointer 34 will always give an accurate reading as to the quantity of water in the tender tank. Any preferred recording attachment may be incorporated with this structure so that a constant and automatic index as to the quantities both of the coal and of the water taken aboard or consumed may be provided.

Any loss of pressure in the hydraulic system may be compensated for in any one of the approved ways the details of which are not illustrated since they form no part of the present invention. I have shown the device in rather simple outline and without complicating modifications but it will be understood that many variations of the above arrangement might be developed all of which would come within the spirit and scope of the invention. Excess of vibration in the pressure system will be taken care of by suitable mechanical means and certain safety devices will be provided for preventing accident in case any part should break. These however in themselves are not a part of the present invention and are therefore not illustrated in detail in the accompanying drawings.

The advantages of my invention are numerous and of great value. It affords an accurate scheme for determining the amount of coal consumed either in building fires, or while waiting trains, or while actually pulling trains. Accurate information of the kind possible where my invention is used would permit a comparative grading of the engine crews, the offering of a reward for particularly good service with its consequent improvement in the operation of the system. Such an accurate record would also permit the immediate discovery of any poor condition of the locomotive leading to unnecessary waste of fuel. The relation of the quantity of water consumed to the quantity of coal burned is an excellent indication of the condition of the locomotive boiler and a regular knowledge of this relation would permit determination of the proper times for cleaning flues and for washing boilers so as to keep them at the highest point of efficiency. A locomotive which is blowing badly past the piston packing rings will require a large amount of steam and thus will consume an excessive quantity of water and at the same time will, of necessity, require the burning of an unusual amount of coal. However, on the other hand, if scale is allowed to accumulate on the boiler flues, an excessive quantity of coal will be burned which will not be reflected by an unusual increase in the quantity of water consumed. In the first instance it is easy to immediately determine that the fault lies somewhere in the machinery or in the skill with which the engineer is operating his machinery while in the second place it is easy to quickly decide that the fault lies entirely with the condition of the boiler.

The structure I propose is such that it can easily be applied to existing equipment without extensive alterations and without unusual cost and is capable of itself being built and applied at a very reasonable charge. The competitive spirit encouraged by this device and the schemes which it makes possible will be reflected in the engineer's insisting on the necessary repairs which is a very valuable point. Another advantage resides in the fact that the exact knowledge which the engineer can have of the quantity of coal and water on board will very frequently allow him to pass a water tank or coaling station at which he otherwise might have to stop because of the uncertainty involved in his knowledge of quantities of coal and water on board.

I claim:

1. A device for indicating the respective weights of coal and water on a locomotive tender which comprises in combination, means for registering the combined weight of the coal and the water, a movable scale associated with such means, a float actuated by the rise and fall of the water in the tender adapted to move said scale, and a stationary scale associated with the movable scale, the latter indicating upon the former the quantity of water and the combined weight registering means indicating upon the movable scale the quantity of coal.

2. A weighing device of the character described comprising in combination, an indicator, mechanism adapted to move it in response to the total weight of two materials, a second indicator associated with the first indicator, and means adapted to move said second indicator in proportion to the weight of one of the materials, the first indicator in association with the second giving a reading of one of the two materials while the second indicator gives a reading of the other of the two materials.

3. A device for indicating the respective weights of coal and water on a locomotive tender which comprises in combination, a Bourdon tube indicator, means adapted to transmit pressure thereto in response to the combined weight of the coal and the water, a second indicator, and means adapted to move it in response to the quantity of water, the Bourdon indicator giving a reading of the amount of coal on the float operated indicator.

4. A device for indicating the respective quantities of two materials on a common support, one material at least being a liquid which comprises in combination, means for registering the combined weight, a movable scale associated with such means, a float, mechanism actuated by said float for moving said scale in accordance with the rise and fall of the liquid, and a stationary scale associated with the movable scale, the latter indicating upon the former the quantity of liquid and the combined weight registering means indicating upon the movable scale the quantity of the other material.

5. A weighing device for the coal and water loads of tenders which includes in combination a scale, means adapted to actuate it in proportion to the quantity of one of said loads and weighing mechanism for indicating the quantity of the other of said loads adapted to receive its indication by cooperation with the scale.

6. A device for indicating the respective quantities of different materials on a common support which comprises in combination an indicator, a movable scale associated therewith, means adapted to actuate the indicator in accordance with the combined weight of the different materials, and means adapted to actuate the scale in accordance with the weight of but one of the materials.

7. A device for indicating the respective weights of coal and water on a locomotive tender which comprises in combination, a Bourdon tube indicator, means adapted to move it in response to the combined weight of the coal and the water, a movable dial or scale upon which the Bourdon tube indicator gives a reading, means for moving said dial in accordance with the amount of water in the tender, and a second but fixed dial or scale upon which the movable dial gives a reading, the reading on the movable dial giving the quantity of coal in the tender while the reading on the fixed dial gives the quantity of water in the tender.

8. A device for indicating the respective weights of coal and water on a locomotive tender which comprises in combination, a Bourdon tube indicator, means to move it in response to the combined weight of the coal and the water, a movable dial or scale upon which the Bourdon tube indicator gives a reading, means for moving said dial in accordance with the amount of one of the materials in the tender, and a second but fixed dial or scale upon which the movable dial gives a reading of such material, the reading on the movable dial giving the quantity of the other material on the tender.

9. A load weighing device carried by a vehicle including in combination, a truck structure, a lever pivoted on the truck structure, direct means for transmitting load to one side of the lever, hydraulic means for transmitting load to the other side of the lever, and a Bourdon guage associated with said hydraulic means.

10. In a vehicle load weighing device of the character described the combination with the truck frame and truck center pin, of a lever mounted on the frame having a loose fit on the center pin, direct means for transmitting load to one side of the lever, a yielding bearing for transmitting load to the other side of the lever and a Bourdon guage operable by the pressure on said yielding bearing.

11. A load weighing device for vehicles bearing a plurality of variable loads, comprising in combination an indicator, mechanism adapted to actuate it in proportion to the total of the loads, a second indicator, and mechanism adapted to actuate it in proportion to one of the loads, said indicators being juxtaposed to indicate directly the difference of their readings.

In testimony whereof, I have hereunto signed my name.

EARL A. AVERILL.